ature of this issue, as is no longer.

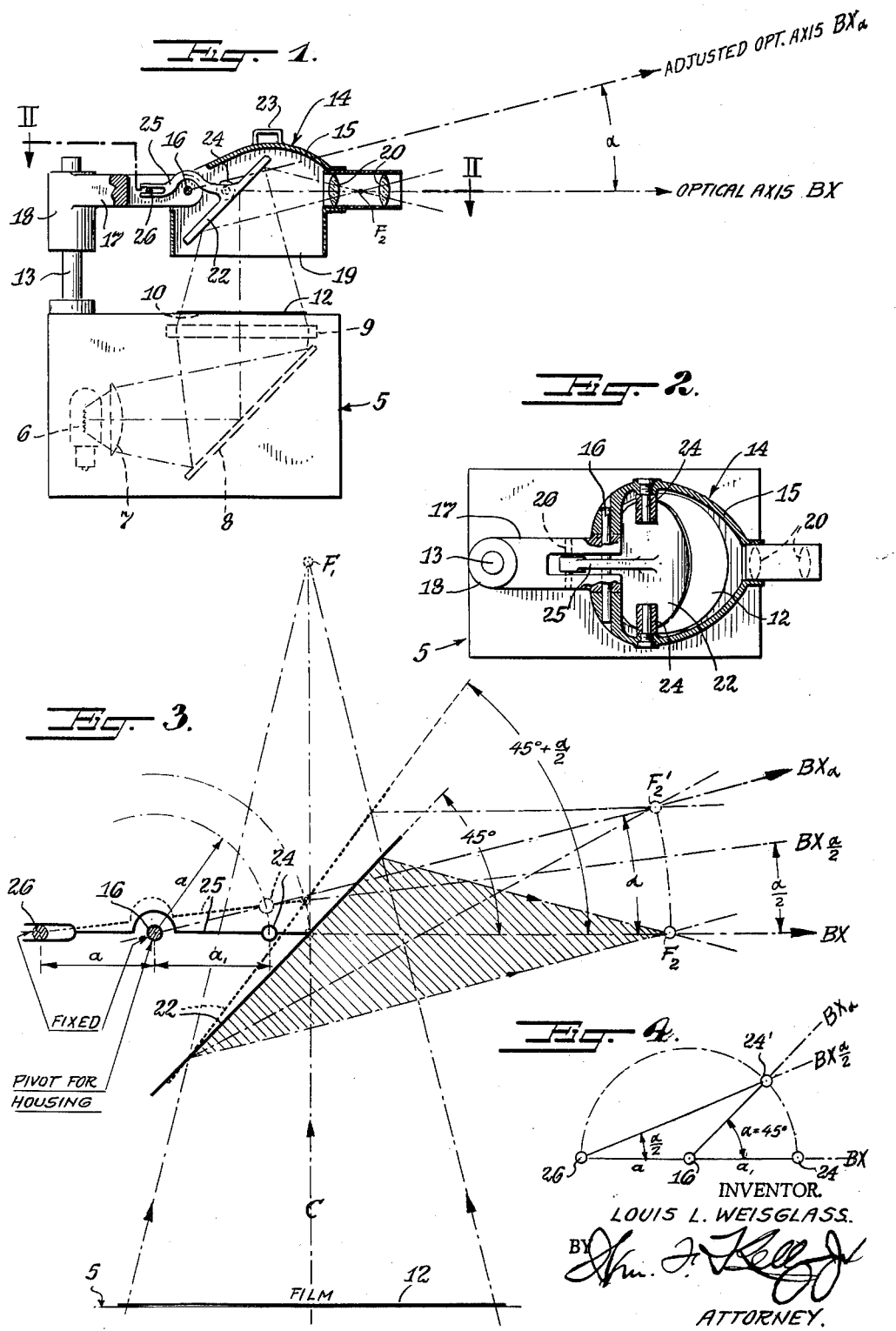

United States Patent Office 3,081,670
Patented Mar. 19, 1963

3,081,670
OVERHEAD OPTICAL PROJECTOR
Louis L. Weisglass, New York, N.Y., assignor to Simmon Brothers, Inc., Long Island City, N.Y., a corporation of New York
Filed Dec. 8, 1961, Ser. No. 157,908
3 Claims. (Cl. 88—26)

The present invention relates to an overhead optical projector such as is used for projecting an enlarged image on a screen secured to a wall or carried by an upright stand.

Light projecting devices of this general type have long been known to the art wherein the film transparency is normally disposed in a horizontal plane and a light beam is projected through the entire area of the transparency onto an angularly disposed mirror which in turn reflects the light beam in a horizontal plane through an image forming lens onto a perpendicularly positioned screen. It frequently happens, however, that the screen is elevated relative to the horizontal axis of the emitted light beam which heretofore has necessitated tilting of the entire projector so that the axis of this projected exit beam can be made to coincide with the center of such elevated screen. This often results in the projector being precariously supported at the extremes of its adjusted tilting supports.

It is accordingly the primary object of the present invention to provide an overhead optical projector wherein the film transparency is continuously maintained in a horizontal plane and normal to a light beam passing therethrough with a portion of the projector being adjustable to position the projected exit beam in a selected plane from the horizontal to an acute angle relative thereto.

Another object of the present invention is the provision of a light projecting device wherein the axis of the projected exit beam can be adjusted from a horizontal position to an acute angle relative thereto to reflect an image from a fixed horizontally disposed film transparency onto an elevated screen.

Another object of the present invention is the provision of an overhead optical projector wherein the film transparency to be projected is maintained in a horizontal plane while the portion of the projector carrying the image forming lens is adjustable to vary the direction of the axis of the projected exit beam from the horizontal to an acute angle relative thereto and the reflecting mirror interiorly of the adjustable portion is in turn adjustable relative to said portion.

A further object of the present invention is the provision of an overhead optical projector wherein the film transparency to be projected is maintained in a horizontal plane while the portion of the projector carrying the image forming lens as well as an angularly disposed reflecting mirror is adjustable to vary the direction of the axis of the projected exit beam from the horizontal to an acute angle relative thereto and the reflecting mirror is simultaneously adjustable relative to said adjustable portion through an angle corresponding to one half the total angle of adjustment of said portion.

Still further objects of the present invention will become obvious to those skilled in the art by reference to the accompanying drawing wherein:

FIGURE 1 is an elevational view partly in section of an overhead optical projector constructed in accordance with the present invention, FIG. 2 is a sectional view taken on the line II—II of FIG. 1, FIG. 3 is a schematic illustration of the various angular movements of the adjustable portion of the projector together with the angular positions of adjustment of the reflecting mirror, and FIG. 4 is a graphic illustration of the geometrical principle involved in the present light projecting unit.

The foregoing objects of the present invention are achieved by the provision of a base member which houses the light source and a reflecting mirror and in which condensing lenses direct the light beam through a horizontally fixed film transparency into an adjustable head portion. The entering light beam is then reflected by an angularly disposed adjustable mirror through an image forming lens system with the axis of the projected exit beam being in an angular direction from the horizontal to an acute angle relative thereto depending upon the position to which the adjustable head portion is set. Also in order to keep the focal point of the projected exit beam in a definitely fixed position with respect to the image forming lens, the angularly disposed mirror in the head portion is simultaneously adjustable by adjustment of the head portion, to an angular position corresponding to one half the angular position to which the head portion has been adjusted at any given time.

Referring now to the drawing, which illustrates one simple form which the present invention may take, the overhead optical projector therein shown comprises a base member 5 which may take the form of a rectangular box or the like. Disposed interiorly of this base is an incandescent lamp 6 and a focusing lens 7 which concentrates the light beam onto a reflecting mirror 8 disposed at an angle of 45°. The light beam is thus projected vertically upward through a Fresnel lens 9 where it then passes outwardly from the base 5 through a suitable opening 10 in the top thereof. A film transparency 12 is placed in a fixed horizontal position immediately over the base opening 10 so that the axis of the light beam C passes through such transparency or negative and is projected upwardly toward a focal point $F_1$ as shown in FIG. 3.

A support, such as an upright column 13, extends upwardly from the base 5 and an adjustable head 14 is carried by such supporting column 13. This adjustable head 14 is shown as comprising a casting portion 15 of a distorted elliptical configuration which is pivoted at 16 to a horizontally extending arm portion 17 of a collar 18 slidable along the supporting column 13. The adjustable head 14 has an opening 19 in the bottom thereof normally arranged to align with the base opening 10 and film transparency 12 so that the emerging light beam from the latter enters the adjustable head 14. At right angles to the opening 19 this head also is provided with a lens opening housing image forming lenses 20 which are adjustable in the usual manner along the optical axis BX for the purpose of properly focusing the exit light beam and the image projected thereby onto a vertically disposed viewing screen (not shown) secured to a wall or supported on a stand.

The adjustable head 14 is provided with a reflecting mirror 22 normally disposed at an angle of 45° relative to the fixed horizontally disposed film transparency 12 and the optical axis BX of the projected exit beam when extending in a horizontal direction. Since the head 14 is adjustable about its pivotal connection 16 by an operator grasping a handle or the like 23 from the horizontal, as shown by the optical axis BX in FIGS. 1 and 3, to an acute angle relative to the horizontal such as illustrated by the optical axis $BX_a$ in these same figures, the focal point $F_2$ would be so altered that the light beam would never emerge from the adjustable head if the reflecting mirror remained at an angle of 45° relative to any new optical axis $BX_a$.

Accordingly, as shown in FIGS. 1 and 2, the reflecting mirror 22 is likewise pivotally supported from the adjustable head 14 by trunnions or the like 24 and an operating lever arm 25 is fixedly connected to this mirror 22 which passes around the head pivot 16 and through a bifurcated portion of arm 17. The opposite end of this arm 25 is pivotally and slidably connected by a pivot pin 26 to such horizontally extending arm portion 17 and which pivot 26 forms a true pivot about which the mirror 22 actually rotates with the pivot 24 thus constituting merely a bearing for the adjustable mirror 22. This arrangement accordingly causes the reflecting mirror 22 to be automatically and simultaneously adjusted about the pivot pin 26 by the adjustment of the head 14 about its fixed pivot 16 with the angular adjustment of the mirror from its normal 45° position about the pivot bearing 24 being always equal to one-half the angular adjustment of the head itself so that the focal point $F_2$ always lies on the axis of the projected exit beam regardless of the angular position of the optical axis $BX_a$.

This operation may be better understood by specific reference to FIGS. 3 and 4. Considering first FIG. 4 the geometrics of the construction will be apparent when one considers the points 26, 16 and 24 lying on an optical axis BX and wherein the spacing $a$ between points 26 and 16 is equal to the spacing $a_1$ between points 16 and 24. If the optical axis BX is moved about the point 16 through an angle of 45° to a new optical axis $BX_a$, the angle $\alpha$ between the original horizontally disposed optical axis BX and the new optical axis $BX_a$ will equal 45° as shown in FIG. 4. Considering point 24' as an imaginary focal point it will then lie on the optical axis $BX_a$ at an angle $\alpha=45°$ relative to optical axis BX. Also since the spacing $a_1$ is equal to the spacing $a$ an axis drawn through the point 24' on the optical axis $BX_a$ and point 26 on optical axis BX will form an angle $$\frac{\alpha}{2}$$

therebetween or in other words when point 24 has been moved about point 16 an angle $\alpha=45°$ this same point 24' will have been moved about point 26 an angle $$\frac{\alpha}{2}=22\tfrac{1}{2}°$$

Applying these geometrics to the present device it will be noted from FIG. 3 that the mirror 22 is set about its adjustable pivot bearing 24 so as to dispose the plane surface of this mirror normally at an angle of 45° relative to the horizontal optical axis BX in the same manner as shown in FIGS. 1 and 2. At the same time the operating lever arm 25 is disposed in a horizontal plane which thus places the pivot points 16 and 26 on the same horizontally disposed optical axis BX along with pivot bearing 24 carrying the mirror 22 at its 45° angle. In this position of the projector the axis C of the emerging light beam passing upwardly through the film transparency 12 in the direction of focal point $F_1$ is reflected by the mirror 22 in a converging pattern, as shown by the line-shaded area, to the focal point $F_2$ lying on the horizontally disposed optical axis BX at a point between the image forming lenses 20 as seen in FIG. 1. Also in this position of the projector the three pivot points 16, 24 and 26 are likewise equidistantly spaced from each other along the optical axis BX as shown in FIG. 3.

Assuming now that it is desired to raise the adjustable head 14, so as to project the emerging light beam on an elevated screen affixed to a wall or stand, the operator grasps the handle 23 and rotates the head 14 about its pivotal support 16 through an angle $\alpha$ (FIG. 3) which would then position the focal point $F_2'$ on the newly positioned optical axis $BX_a$. If the mirror 22 still remained at its 45° angle relative to this new optical axis $BX_a$ the focal spot $F_2'$ would no longer lie between the image lenses 20 but would be at a point outside the adjustable exit opening with the result that no light would then emerge from the projector.

Since, however, the mirror 22 is rotatable about the pivot bearing 24 in the head 14 and affixed to the operating lever arm 25 which is in turn pivoted at 26, the rotation of the adjustable head 14 about its pivot 16 through the angle $\alpha$, as previously mentioned, will also cause simultaneous rotation of the mirror 22 about the true pivot point 26 through an angle $$\frac{\alpha}{2}$$

so that the plane surface of the mirror now lies at an angle of $$45°+\frac{\alpha}{2}$$

as shown in FIG. 3. An axis $$BX\frac{\alpha}{2}$$

is also thus formed which extends from the pivot point 26 and through the pivot bearing 24, and in the newly adjusted position of the head 14 and mirror 22, the focal point $F_2'$ is again between the image forming lenses 20 on the axis $BX_a$ with the axis C of the light beam also in coincidence therewith.

It should thus be apparent from the foregoing that upon adjustment of the head 14 to any desired acute angle relative to the horizontal, so as to raise the exit light beam to illuminate an elevated screen, such adjustment of the head by the operator simultaneously and automatically adjusts the reflecting mirror within the adjustable head through an angle equal to one-half the angle through which the head itself is moved. This arrangement accordingly causes the focal point of the exit light beam to always remain in a fixed position on the optical axis of the projector regardless of the acute angle to which it is moved relative to the horizontal.

Although one specific embodiment of the present invention has been herein shown and described it is to be understood that still further modifications thereof may be made without departing from the spirit and scope of the appended claims.

I claim:
1. An overhead optical projecting device comprising:
   a base for supporting a film transparency and provided with a light source for passing a beam of light through said transparency,
   a support secured to said base, an adjustable head pivotally carried by said support having a light inlet opening and an angularly disposed exit optical beam opening and movable by an operator to project the axis of the exit optical light beam from a horizontal plane to one forming an acute angle relative thereto,
   and a mirror rotatably supported by and inside said adjustable head to one side of the pivotal connection thereof and normally disposed at a preselected angle relative to the inlet and exit beam openings of said adjustable head,
   and said mirror being also pivotally and slidably connected to said support on the opposite side of the pivotal connection of said adjustable head therewith to cause rotation of said mirror about its support and alignment of the axis of the reflected light beam with said exit optical beam opening upon adjustment of said head to any angular position.

2. An overhead optical projecting device as set forth in claim 1 wherein:
   the support about which said mirror rotates and the pivotal and slidable connection of said mirror with said head support are spaced equidistantly from the axis of rotation of said adjustable head and all such pivot points lie in a common plane when the axis of the projected exit optical light beam is in a horizontal plane.

3. An overhead optical projecting device as set forth in claim 1 wherein:

rotation of said adjustable head about its pivotal connection with said support causes simultaneous rotation of said mirror about its head support through an angle equal to one-half that through which said adjustable head is rotated by an operator.

References Cited in the file of this patent
UNITED STATES PATENTS

| | | |
|---|---|---|
| 1,748,624 | Shively | Feb. 25, 1930 |
| 2,304,921 | Hopkins | Dec. 15, 1942 |
| 2,596,393 | Fitzgerald | May 13, 1952 |
| 2,859,660 | Lucas | Nov. 11, 1958 |
| 2,946,256 | Tiffany | July 26, 1960 |